Figure 1:
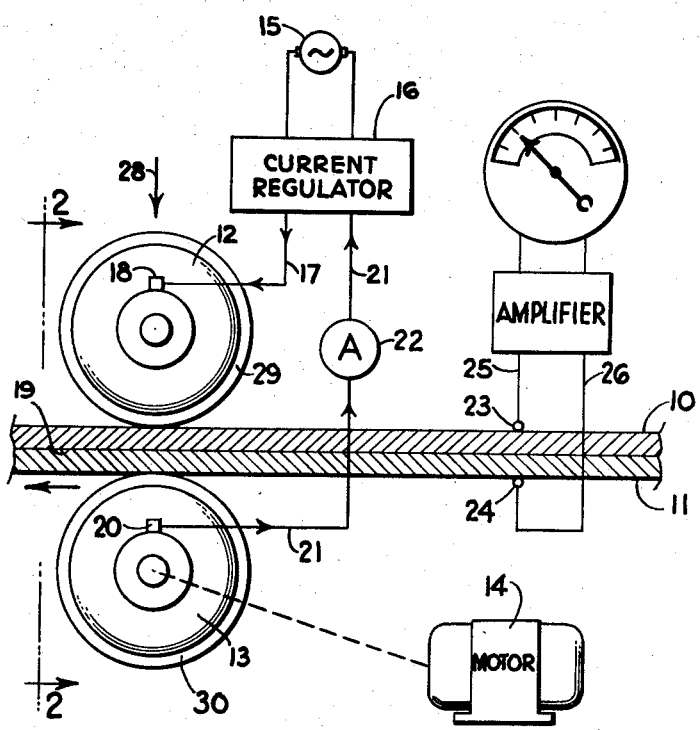

July 21, 1959  R. A. WEBSTER  2,896,159
METHOD AND APPARATUS FOR MEASURING ELECTRICAL RESISTANCE
Filed July 14, 1955

INVENTOR
ROBERT A. WEBSTER
BY
Elliott & Pastoriza
ATTORNEYS

United States Patent Office 2,896,159
Patented July 21, 1959

2,896,159

METHOD AND APPARATUS FOR MEASURING ELECTRICAL RESISTANCE

Robert A. Webster, Santa Monica, Calif., assignor to Webster Instrument, Inc., a corporation of California Application July 14, 1955, Serial No. 521,967

4 Claims. (Cl. 324—64)

This invention relates generally to an improved method and apparatus for measuring electrical resistance, and more particularly, to a system for indicating the average electrical resistance of a body surface such as the interface between two metals to be subsequently welded.

A preferred application of this method and apparatus is in conjunction with electrical resistance welding and the invention will be described in this connection. It is to be understood, however, that the system will find wide application in other fields.

In joining two pieces of metal by conventional electric resistance welding equipment, electrodes are urged against opposite sides of the metal pieces between which the joint is to be made. Preferably, considerable pressure is applied to the work, and while the pieces are under pressure, a current of high amperage is passed through the electrodes and work. The weld is formed by heat resulting from the passage of current through the resistance of the pieces. If there were no resistance, there would be no heat generated, whereas too high a resistance might result in too much heat and fusion of the metals. It will be evident, therefore, that variations in the resistance of the metal pieces over different portions to be welded can result in wide variations in the weld strength.

In the welding of certain types of alloys, such as aluminum alloys, the matter of surface resistance becomes an important factor. This is because aluminum and similar metallic heat conductors have very low resistance and, therefore, require a relatively heavy welding current as compared to some other metals. With a heavy welding current, even slight variations in the surface resistance of the work can cause large deviations in the heat generated for the weld and the subsequent weld strength. This large variation of heat with small variations in surface resistance for large currents results from the fact that the generated heat varies as the square of the current value.

In the case of aluminum and aluminum alloys, there is usually some oxide present on their surfaces as a result of exposure to the air. This oxide coating is not a good electrical conductor and will increase the surface resistance of the metal considerably. The amount of oxide present and thus the resistance of the material, varies with the age of the material, storage conditions, and other factors so that there is no assurance of uniformity in the surface resistance of pieces to be welded together.

Before welding certain material such as aluminum, it is customery, accordingly, to perform a cleaning operation to remove grease and foreign matter and then to etch by any of several methods to reduce the oxide coating to a relatively low value and thereby provide a surface condition more nearly uniform as to resistance. The welding operation is then performed within a few hours to avoid any appreciable build up of an oxide coating from exposure to the air after the cleaning and etching processes have been completed.

In order to evaluate the cleaning processes, surface resistance tests are usually conducted on each batch of materials after cleaning. Generally, the actual testing is done on samples of production material cleaned and etched along with the production batch. Using existing equipment, a number of resistance readings are taken on the cleaned samples at various points and then a decision is made as to whether the general average of the readings is considered to be satisfactory or whether the whole lot requires further etching.

Conventional equipment now being used to make these surface resistance readings usually consists of a pair of copper electrodes between which the two pieces of metal being tested are clamped under pressure. A fixed current having a regulated value within the range of from twenty to one hundred amperes, for example, is caused to flow through the electrodes and material. A voltage drop resulting from this current is then detected by two small auxiliary electrodes in contact with the two pieces of metal respectively and fed to a meter calibrated to read resistance directly in micro ohms. A reading is taken, and then another portion of the sample surface is clamped between the electrodes and another reading taken.

In making a number of individual readings as described above, it is seldom that they will all be near one value. Out of a dozen readings, for example, there may be four or five below 10 micro ohms, a few above 50 micro ohms and others scattered in between.

Bearing the above in mind, it is a primary object of the present invention to provide an improved method and apparatus for making surface resistance test measurements in which the necessity for manually making many independent readings and calculating their average is avoided.

More particularly, an object is to provide a measuring system in which a direct reading of the average value of the surface resistance of a body may be indicated.

Briefly, these and other objects and advantages of the present invention are attained by moving a current source, such as a pair of spaced electrodes, over different portions of a surface area to be tested and simultaneously passing current through these different portions. A continuous voltage reading resulting from this current is indicated on a highly damped meter so that variations in the resistance of the surface portions causing a variation in the voltage detected during movement, will be rapid as compared to the mechanical time constant of the meter. As a result, the meter will indicate the average value of the voltage during the period of relative movement between the electrodes and the surface areas being tested.

A preferred apparatus for effecting this method comprises a pair of rollers adapted to engage and to roll over different surface portions of the material being tested while current is passed therebetween. Small shoes or pick up rollers are simultaneously employed to yield an indication of the voltage drop or potential differences established as a result of the current flow through the different portions of the surface area.

Figure 2:
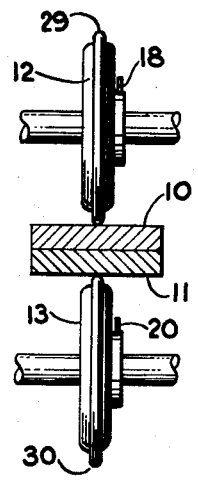

A better understanding of the method and apparatus of this invention will be had by referring to the accompanying drawings, in which:

Fig. 1 is a schematic representation of one type of apparatus for carrying out the method of this invention; and, Fig. 2 is an end view taken in the direction of the arrows 2—2 of Fig. 1.

Referring to Fig. 1, there are shown two pieces of metal 10 and 11 such as test samples of aluminum sections to be welded together. As shown, the two pieces are in face to face engagement to form a composite material positioned to be fed between a pair of rollers 12 and 13. One of the rollers, such as roller 13, for example, may be driven by a suitable motor 14 to feed the composite material through the rollers so that different portions of the metal surfaces are engaged by the rollers.

In accordance with the invention, the rollers 12 and 13 are made of copper or other highly conductive material and arranged to pass electric current through the composite material 10, 11, while the same is being moved between the rollers by the motor 14. As shown, the current may be supplied from a conventional A.C. or D.C. source 15, passed through a current regulator 16 which may simply be a current limiting resistor, for example, a lead 17 and brush 18 to the roller 12. From the roller 12, the current passes down through the pieces 10 and 11 crossing the interface 19 to pass into the roller 13 and return lead 21 to the power source 15. An ammeter 22 may be placed in series with this circuit to indicate the value of current flowing at all times. It is important that the value of this current remain substantially constant regardless of the variations in resistance in the composite material and the voltage applied thereto. This constant value of current is assured by the current regulator 16.

Simultaneously, with the movement of the composite material at a given rate between the rollers and the passage of current therethrough, the voltage drop or potential difference resulting from the current are picked up by a pair of small electrodes 23 and 24 arranged to engage opposite sides of the material. This voltage is fed through leads 25 and 26 to a highly damped meter 27. An amplifier may be interposed in this circuit to increase the signal strength to the meter. The degree of damping or inertia necessary in the meter is determined by the rate of change of the surface resistance from one surface portion to another as the material is passed between the rollers. The speed of the rollers may be adjusted such that this rate of change is large compared to the natural period of the meter so that the meter needle will indicate the average value of the voltage and, therefore, the resistance of the material.

It is preferable that the pressure of the rollers 12 and 13 on the samples tested as indicated schematically by the arrow 28, be adjusted to the particular characteristics of the sample type under test. Thus, where the samples are relatively thick pieces of hard metal, it is best to use a relatively high pressure between the electrodes, preferably corresponding to that pressure which will be used during the actual welding operation. On the other hand, if the metal pieces are thin, or are of softer material, less pressure should be used.

In the particular apparatus illustrated in Figs. 1 and 2, it is desirable to obtain a resistance reading indicative of the average value of the resistance of the interface 19, inasmuch as this interface resistance constitutes the portions of the metal to be welded together. To this end, the roller electrodes 12 and 13 are provided with thin or narrowed peripheries 29 and 30 as best shown in Fig. 2, whereby the area of engagement of the opposite faces of the material by the electrodes is relatively small, resulting in a relatively high unit pressure. The corresponding unit pressure between the interfaces is much less because of the much larger engaging areas and, therefore, the resistance measured will be mainly that of the interface.

Many modifications falling within the scope and spirit of the present invention will occur to those skilled in the art. The method and apparatus is, therefore, not to be thought of as limited to the particular embodiment shown herein for illustrative purposes.

What is claimed is:

1. An apparatus for measuring the average electrical resistance of the interface in a composite material made up of two flat pieces of metal placed in face to face engagement, comprising: a pair of rollers adapted to engage opposite sides of said composite material; means for varying the pressural engagement of said rollers in accordance with the hardness characteristics of said material; means for rotating one of said rollers to move said composite material between said rollers at a given rate; means for passing a regulated current of constant value from one roller, through said composite material interface, to the other roller while said composite material is moving; means for picking up the potential difference from across said composite material interface as a result of said current; and means for indicating the average value of said potential difference.

2. An apparatus according to claim 1, in which the peripheral portions of said rollers in engagement with said composite material are thinner than the width of the rollers whereby a relatively small area of said opposite sides of said composite material is engaged by said rollers with correspondingly increased unit pressure.

3. An apparatus according to claim 2, in which said means for indicating the average value of said voltage comprises a meter having a damping characteristic such that fluctuations of said voltage as a result of movement between said material and rollers are too rapid to affect said meter.

4. A method of measuring the average electrical resistance of the inter-face in a composite material made up of two flat pieces of metal placed in face to face engagement, comprising the steps of: engaging opposite sides of said material in rolling contact with an electrical conducting source; adjusting the normal pressure of engagement in accordance with the characteristics of said material; passing electrical current regulated to have a constant value from said source to said material; effecting relative, constant movement between said material and said source for a given period of time so that current passes through different portions of said inter-face; picking up a voltage from said material as a result of said current during said given period; and applying said voltage to a meter having a long damping period with respect to the rate of said relative movement, whereby an average reading proportional to the average value of electrical resistance of said inter-face is provided during said given period.

References Cited in the file of this patent

UNITED STATES PATENTS

| | | |
|---|---|---|
| 1,895,643 | Putnam | Jan. 31, 1933 |
| 2,142,619 | Sciaky | Jan. 3, 1939 |
| 2,215,805 | Wills | Sept. 24, 1940 |
| 2,351,201 | Gillis | June 13, 1944 |
| 2,371,636 | McConnell | Mar. 20, 1945 |
| 2,401,917 | Drake | June 11, 1946 |
| 2,713,662 | Hart | July 19, 1955 |